3,562,088
PRESSURE SENSITIVE ADHESIVE TAPE

Nicholas S. Newman, West Newton, Mass., and Donatas Satas, Palatine, Ill., assignors to The Kendall Company, Boston, Mass., a corporation of Massachusetts
Filed Dec. 8, 1967, Ser. No. 689,010
Int. Cl. C09j 7/04
U.S. Cl. 161—151                                 5 Claims

ABSTRACT OF THE DISCLOSURE

A thermosettable but temporarily thermoplastic acrylic film is cast upon a layer of thermoplastic film such as polypropylene. A layer of unspun and unbonded textile-length fibers is superimposed upon the acrylic film, and the multi-ply assembly is subjected to heat and pressure sufficient to cause the films to flow around and encapsulate at least 80% of the fibers, which remain in discontinuous phase. Unlike ordinary laminates, such products are characterized by a single inflection point in the stress-strain curve, and are suitable for bases for adhesive tapes.

---

This invention relates to a nonwoven fabric base for adhesive tape use, and to adhesive tapes prepared therefrom. More particularly it relates to soft and conformable adhesive tapes comprising a thermoplastic film of enhanced thermal stability.

It is known to combine thermoplastic film materials with fibrous arrays such as nonwoven fabrics to prepare bases for the manufacture of pressure-sensitive adhesive tapes. It is also known to combine unbonded fibrous webs with certain species of films, such as transiently thermoplastic acrylic films, to prepare bases for adhesive tapes, as set forth in U.S. patent application Ser. No. 563,238, filed July 7, 1966, a continuation-in-part of application Ser. No. 530,734 of Feb. 28, 1966, which in turn is a continuation-in-part of application Ser. No. 514,079, filed Dec. 15, 1965, to one of the present inventors, all three applications now abandoned.

Acrylic films suitable for processing into conformable adhesive tape bases are soft and flexible, and they show good anchorage characteristics when coated with most conventional pressure-sensitive adhesive masses. As a result of this compatibility, however, such tapes must be coated or treated on the non-adhesive surface with a substance which is repellant or non-adherent to the adhesive mass, to allow unwinding when the tape is processed into roll form. Additionally, as described in Ser. No. 563,238, the particular type of modified acrylic film of interest here is in its thermoplastic stage of a soft and tacky nature, and must be manipulated by the support of release paper until it has been converted at least partially into the thermoset condition. The use of such release paper in the calendering operation to form the nonwoven fabric base is a cumbersome and expensive expedient, since the paper is capable of only limited reuse.

It is therefore an object of this invention to provide a process for the bonding of fibrous webs by the use of transiently thermoplastic acrylic films without the use of release paper.

It is an additional object of the invention to provide an adhesive tape base comprising thermoplastic films, said base having unexpected dimensional stability at elevated temperature.

Other objects of the invention will appear more fully in the following description and drawings, in which.

The acrylic films referred to as transiently thermoplastic in this application are modified acrylic polymers which are generally cast from an aqueous phase in the form of a soft, tacky film which, while it remains in this state, has thermoplastic properties. Upon long standing at room temperature, or upon brief exposure to temperatures of 325–350° F., cross-linking modifying agents in the film composition convert the film to a thermoset condition.

In the practice of this invention, a transiently thermoplastic acrylic composition is coated, as by reverse roller coating, knife coating, or the like, onto a layer of thermoplastic film such as polyolefin, polyvinyl chloride, and the like. The coating operation may be set up in tandem with the subsequent calendering, or it may be a separate operation, with the acrylic-thermoplastic film combination being rolled up and subsequently unrolled, the thermoplastic film serving as a good release agent. The acrylic film, containing 5–15% moisture, is conveniently cast to a depth of about 1 mil, at a working viscosity of 200–1,000 centipoises.

Figure 1:
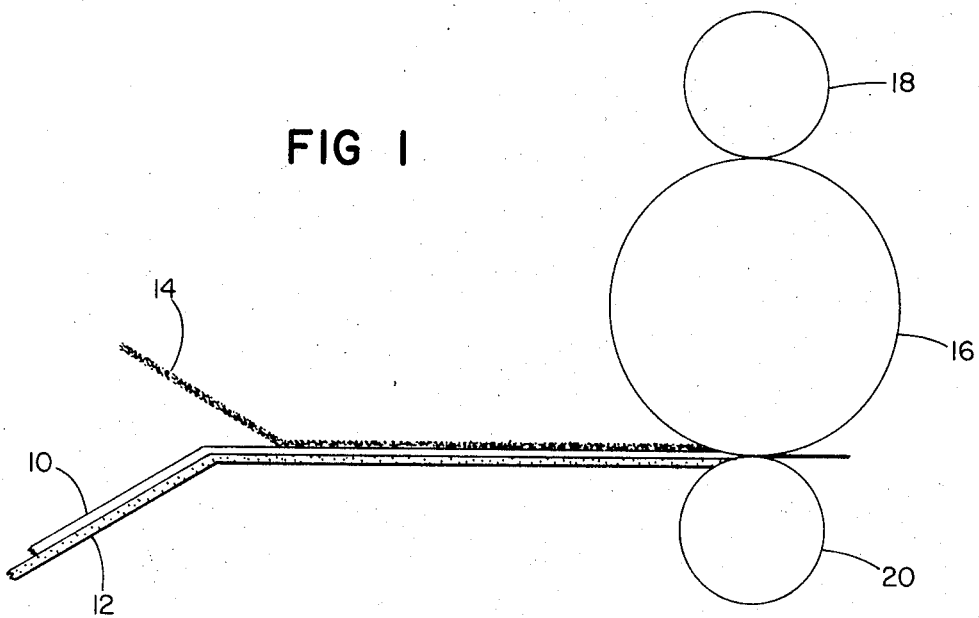
FIG. 1 is a schematic representation of the positional relationship of the elements of the invented structure before calendering.

Referring to FIG. 1, the combined acrylic film 10 thermoplastic film 12 are brought into contact with a preferably unspun and unbonded array of textile length fibers 14. In the most economical process, the films are combined continuously and are then plied with a continuous fibrous fleece delivered from a card, garnett, air-lay device such as a Rando-Webber, or the like. If space requirements preclude such an operation, it is possible to prepare the fibrous fleece elsewhere and to combine fleece and films at the calendering operation. In this case, a very light bonding of the fleece may be necessary for handling purposes. However, the fibrous fleece should not be pre-bonded to the extent that is found in conventional nonwoven fabrics of commerce. The starting fibrous array should be so open, and the fibers so free to move with relation to each other, that the film materials can penetrate between and surround at least a major portion of the fibers. The fibers are not felted, bonded, or interengaged to more than a casual degree, so that there is minimal interference with the development of a film-to-fiber bond in which the bonding film is present in continuous phase, with at least major portion of the fibers embedded in the bonding film in discontinuous phase and distributed substantially throughout the body of the binding film.

The term "continuous phase" does not herein signify that the products of this invention are necessarily impermeable to air. If resilient crimped nylon fibers are used in the fibrous fleece, together with substantial calender pressures, the bonding substance may contain numerous small openings or pores which render it air-permeable. Also, if the acrylic polymer is agitated or churned with air while the film is being cast, small air bubbles are incorporated into the film, which in cooperation with the fibrous fleece will leave minute scattered discontinuities in the nonwoven fabric, providing a ready passage for air or water vapor. The term "continuous" therefore means herein that the film combination is not dispersed into disconnected particles or fragments, so that if the fiber substance were to be dissolved out of the nonwoven fabric, a unitary and manipulatable film combination would remain. In the products of this invention, the fibers are held in position essentially by the softened and resolidified film substances.

By textile-length fibers is means those fibers which, in distinction to paper-making fibers, are long enough (usually averaging one-half inch to two inches or more) to be assembled into a fibrous web by the dry-assembly machines common to the textile industry. As the fibrous element in the present invention a wide variety of natural and synthetic fibers can be used, such as cotton, rayon, acetate, polyamide, polyester, polyacrylic, and modacrylic fibers. If thermoplastic fibers are used, the fiber selection and the processing conditions should be so chosen that the hot calendering operation does not destroy the fiber identity, and that the fiber integrity is substantially preserved.

As the film 12 upon which the acrylic film is cast we prefer to use polypropylene, although other thermoplastic films may be used. For simplicity of operation it is preferred to utilize cast or flat-extruded films, because of the lower degree of shrinkage which such films undergo during heating in comparison with uniaxially or biaxially oriented films of the same chemical composition. Although the latter types of film have higher tensile strength, their utilization in this invention necessitates special tensioning devices to hold the film to full width as it passes through the hot nip.

Unification of the fibrous and film components by heat and pressure is conveniently provided by a hot-calendering operation, such as is shown schematically in FIG. 1 where the assembly is passed through a nip formed by a heated steel roll 20 against a cotton-filled roll 16, backed up for balance by another steel roll 18.

Operating conditions in the calendering step will vary with the particular film employed, a general guide being that the temperature should be high enough to soften, but not to melt, the supporting film. This usually means that the process is carried out with the steel roll heated to the softening temperature, but preferably below the melting point, of the supporting film, or else that the processing speeds are such that the supporting film does not become fluid. In the case of polyethylene, the temperature range between softening point and melting point is rather narrow, and calendering temperatures are critical. For this reason, when a polyolefin film is used as a support for the acrylic film, we prefer to use polypropylene, with a working range of around 40° F. between softening point and melting point.

In producing the fabrics of this invention it is essential that substantial pressure be applied to the combination of fibrous web and the two film components while the supporting film, preferably processed against a heated steel roll, is heated to its softening range. For this purpose it is convenient to use a nip of a three-roll calender, with a husk, fiber, or cotton-filled roll 16 mounted between two steel rolls 18 and 20. The calender should be capable of operating at a pressure of at least 500 pounds per inch of nip width through pressure loading on the journals.

It has been found that under proper pressures, the softened film substances are made to flow through and around a majority of the fibers, which were previously unbonded. In this way the fibers are distributed discontinuously throughout the length and breadth and an appreciable part, preferably at least 80%, of the depth of the films, which become firmly bonded to each other with each in continuous phase. Conventional prior art laminates of nonwoven fabrics with thermoplastic films by means of heat and pressure will display, in a test of tensile strength, a compound stress-strain curve marked by a multiplicity of inflection points characteristic of the parting force of film and fabric, rupture of the fabric, and finally a long elongation (several hundred percent) indicating stretching of the unfortified film to its eventual point of rupture. The multi-component structures of the present invention have stress-strain diagrams which are characterized by a single inflection point, at which the whole combination ruptures as a unit. Such unitary behavior, characteristic of a woven fabric rather than a multi-component laminate, indicates that the fibers and film are reinforcing each other in a unique and unexpected manner.

Figure 2:
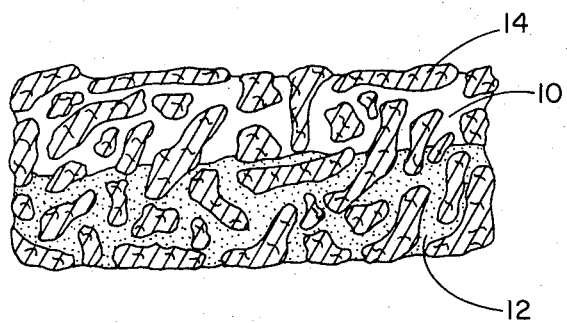
FIG. 2 is a cross-sectional view of the nonwoven fabric of this invention.

The structure a typical nonwoven fabric made according to this invention is represented in cross-section in FIG. 2, wherein the fibers 14 of the fibrous web are shown dispersed between the two films, acrylic 10 and polyolefin 12. Normally, it would not be expected that an acrylic and a polyolefin film would adhere to each other with substantial tenactiy, due to the chemically different natures of the two.

In this respect, the dispersion of the textile fibers through both films causes an interlocking effect between the two films, thereby contributing a high degree of resistance to internal delamination. The fibers serve as a keying interlock between two dissimilar films which normally would not adhere well to each other. At the same time, the essential character of both films is preserved, in that the acrylic portion 10 of FIG. 2 can readily be spread with an adhesive mass, with excellent anchorage, while the polyolefin side 12 of the fabric remains repellant to said adhesive mass.

The preparation of a tape base and of a pressure-sensitive adhesive tape will be illustrated by the following example.

EXAMPLE 1

A 1-mil film of modified acrylic resin (Experimental emulsion 366 by Rohm and Haas) was spread by reverse roller coating onto an 0.87 mil thick undrawn and unoriented polypropylene film. Upon this combination there was applied, on the acrylic side, a carded web of crimped 3 denier nylon fibers 1½ inches long, weighing 25 grams per square yard. The three-ply assembly was then calendered by passing through the nip formed by a steel roll heated to 330° F. and a cotton roll at 270° F. The calender pressure was 1200 pounds per inch of nip width, and the lowermost or polyolefin film was in direct contact with the heated steel roll.

The nonwoven fabric weighed about 50 grams per square yard, and had a tensile strength per inch-wide strip of 18 pounds in the machine direction and 4 pounds in the cross direction. The product was relatively soft and conformable, having an elongation of 78% in the machine direction and 89% in the cross direction.

An interesting and unexpected property of the above product is its thermal stability. When heated to 350° F. for one hour, it showed no significant dimensional change or wrinkling. Similar products based on polypropylene film alone, omitting the acrylic film, have a strong tendency to shrink and distort at such temperatures, indicating that the acrylic film, when bonded to polypropylene film by the process of this invention, exerts a strong stabilizing action at elevated temperatures.

A polymer suitable for use as a pressure-sensitive adhesive was prepared according to Example 12, Table III, of U.S. Pat. No. 3,299,010, issued Jan. 17, 1967. The adhesive polymer was prepared from 1 mole equivalent of ethylacrylate, 4 mole equivalents of 2-ethylhexyl acrylate, and 1 mole equivalent of a mixture of t-alkyl maleamic acids. This mixture of t-alkyl maleamic acids was prepared by reacting maleic anhydride with a mixture of alkyl amines marketed by Rohm and Haas under the trademark Primene 81–R.

A 20% solution of this adhesive polymer in methyl ethyl ketone was spread on the acrylic film side of the nonwoven fabric described above. Anchorage of the adhesive mass to the nonwoven base was excellent, and rolls of such tape could be readily unwound without blocking or transfer of the adhesive mass to the polypropylene face of the fabric. With tensile and elongation properties corresponding so those of the base fabric, the product had utility as a trainers' tape and all-purpose surgical and consumer tape.

Figure 3:
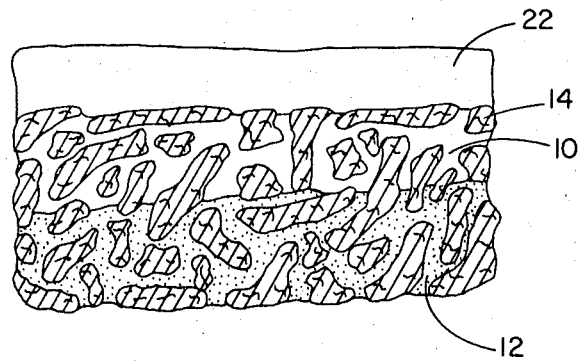
FIG. 3 is a cross-sectional view of a representative pressure-sensitive adhesive tape made according to this invention.

The product is represented in FIG. 3, where the fibrous layer 14 is shown as partitioned between the polypropylene layer 12 and the acrylic layer 10, with the adhesive mass 22 uppermost.

Having thus described our invention, we claim:
1. A nonwoven fabric suitable for use as an adhesive tape base which comprises
   an array of unspun and unwoven textile-length fibers, said fibers being bonded by a pair of polymeric films, one of said films being a polypropylene film and the other a thermostat acrylic film, each film being present in continuous phase, said fibers being distributed substantially uniformly throughout the length and breadth of each film and throughout at least 80% of the thickness of the combined films, the substances of said films being substantially the sole bonding medium serving to unite said fibers into said nonwoven fabric.

2. The product according to claim 1 wherein the textile-length fibers are crimped nylon fibers.

3. The product according to claim 1 wherein the stress-strain curve is characterized by a single inflection point.

4. A pressure-sensitive adhesive tape which comprises an array of unspun and unwoven textile-length fibers, said fibers being bonded by a pair of polymeric films, one of said films being a polypropylene film and the other a thermoset acrylic film, each film being present in continuous phase, said fibers being distributed substantially uniformly throughout the length and breadth of each film and throughout at least 80% of the thickness of the combined films, the substance of said films being substantially the sole bonding medium serving to unite said fibers into said nonwoven fabric, together with a layer of pressure-sensitive adhesive mass adherent to one face of said nonwoven fabric.

5. The product according to claim 4 wherein the pressure-sensitive adhesive mass is adherent to the acrylic film.

References Cited

UNITED STATES PATENTS

| | | | |
|---|---|---|---|
| 2,769,742 | 11/1956 | Helbing | 161—Wear Overlay Dig. |
| 2,949,394 | 8/1960 | Rodman | 161—151 |
| 3,073,734 | 1/1963 | Bemmels | 117—122X |
| 3,245,854 | 4/1966 | Etchison et al. | 161—67X |

FOREIGN PATENTS

| | | | |
|---|---|---|---|
| 583,434 | 9/1959 | Canada | 161—206 |

ROBERT F. BURNETT, Primary Examiner

W. A. POWELL, Assistant Examiner

U.S. Cl. X.R.

117—68.5, 122, 140; 156—278, 324; 161—167, 170